Figure 1:
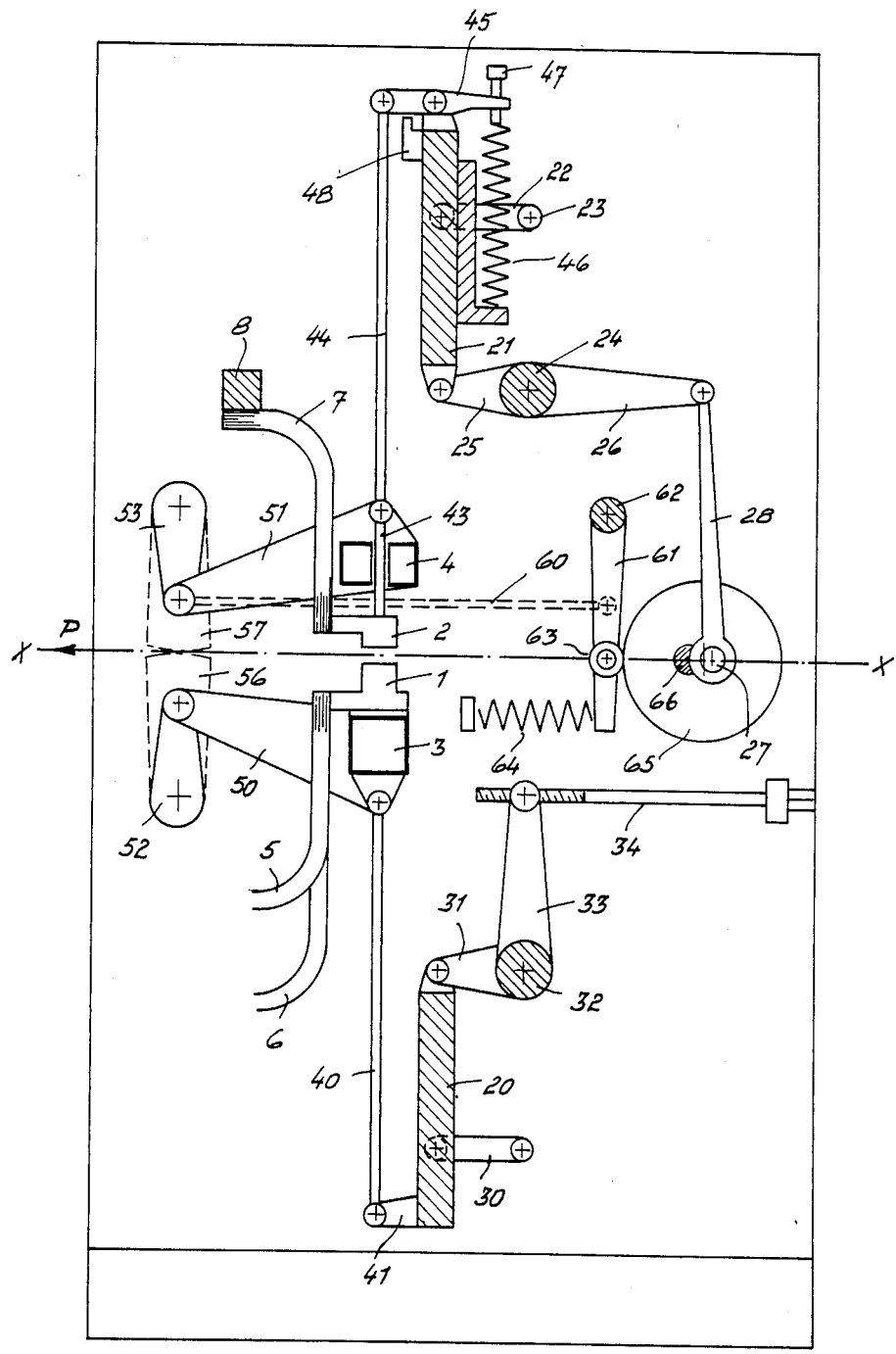

United States Patent [19]
Gött et al.

[11] Patent Number: 4,673,786
[45] Date of Patent: Jun. 16, 1987

[54] ELECTRICAL RESISTANCE GRID WELDING MACHINE

[75] Inventors: Hans Gött; Josef Ritter; Gerhard Ritter; Klaus Ritter, all of Graz, Austria

[73] Assignee: EVG Entwicklungs- u Verwertungs-Gesellschaft m.b.H., Graz, Austria

[21] Appl. No.: 688,633

[22] Filed: Jan. 3, 1985

[30] Foreign Application Priority Data

Jan. 13, 1984 [AT] Austria ..................................... 94/84

[51] Int. Cl.$^4$ ............................................. B23K 11/00
[52] U.S. Cl. .................................. 219/56; 219/86.25; 219/87
[58] Field of Search ................... 219/56, 57, 58, 86.25, 219/86.33, 87, 88

[56] References Cited

U.S. PATENT DOCUMENTS 1,866,382  7/1932  White ..................................... 219/56
3,676,631  7/1972  Ritter et al. ........................... 219/56

FOREIGN PATENT DOCUMENTS 357005   6/1980  Austria .
372632  10/1983  Austria .
1929208 12/1970  Fed. Rep. of Germany ........ 219/56
2152027  4/1973  Fed. Rep. of Germany ........ 219/56
0941082  7/1982  U.S.S.R. .................................. 219/87

Primary Examiner—Clifford C. Shaw
Assistant Examiner—C. M. Sigda
Attorney, Agent, or Firm—Marmorek, Guttman & Rubenstein

[57] ABSTRACT

An electrical resistance grid welding machine for welding a family of wires as it passes through the machine along a feedpath into a strip of welded mesh which has a row of electrodes and a row of counterelectrodes arranged above and below the family of wires. The electrodes and counterelectrodes are supported at intervals by separate electrode beams which are driven back and forth, thus coupling the electrodes and counterelectrodes in a common motion. Pressure beams, which are connected to the electrode beams by rigid connectors, can be driven only perpendicular to the feed path. These pressure beams transmit the welding pressure to the electrodes but permit the electrode beams to carry out their reciprocating motion. The electrodes are guided in their associated electrode beam so as to be able to shift in the beam and are loaded by springs.

8 Claims, 3 Drawing Figures

ELECTRICAL RESISTANCE GRID WELDING MACHINE

The invention relates to an electrical resistance grid welding machine having a continuous feed of a family of wires in the direction longitudinal to the grid strip which is to be produced and rows of electrodes and counter electrodes arranged above and below the grid.

Machines of this type, in which a family of straight wires is fed forward in the longitudinal direction is welded to straight crosswires fed in at intervals into an orthogonal grid having rectangular meshes, are known, for example, from AT-A-No. 357005 and from U.S. Pat. No. 1,886,382. Another machine of the same type is described in AT-A-No. 372632. In this reference a family of wires previously bent in the shape of zigzags is fed in the longitudinal direction in such a way that the crests of the waves in adjacent wires overlap one another and in which through welding of these points of overlap a so called diagonal grid having rhombic meshes is obtained.

The crossing points of the longitudinal wires and crosswires of orthogonal grids having rectangular meshes and the points of overlap of the crests of the waves of the wires bent in the shape of zigzags in diagonal grids having rhombic meshes, are designated herein as "wire knots", in the description of the present invention, in order to embrace both variants of grid welding machines.

Because of the continuous forward feed of the wire, in the case of the grid welding machines dealt with above, the welding is effected by means of roller electrodes, which during the welding process roll over the wire knots which are to be welded. The welding may also be effected by means of electrodes in the form of sectors of rollers which, during the welding process, are forced into a rolling motion over the wire knots and in the pauses between the welding processes are carried back into their starting position.

Welding with roller electrodes and electrodes which are sectors of rollers causes certain difficulties to the extent that the current, depending upon the thickness of the wires to be welded together, must act for a substantial period of time upon the wire knots, and because, after welding has been effected, the point of the weld must still be kept under pressure for a certain length of time in order to ensure consolidation of the freshly welded bond.

During the entire time necessary for the action of the welding current upon the wire knots and for the so-called-afterpressure, in the case of the employment of roller electrodes and electrodes which are sectors of rollers, the material being welded can only cover a relatively short distance along which the electrodes are rolling on the wire knots. Since for given diameters of rolls and wires this distance has a fixed predetermined length, the permissible speed of forward feed of the grid which is to be produced is already fixed by it. It can only be increased by the diameter of the rolls being increased. However large roller diameters demand a considerable outlay in costly electrode material.

A further problem which has not yet been satisfactorily solved in the case of roller electrodes and electrodes which are sectors of rollers, is the feeding in of the welding current with the lowest possible losses in spite of wear and the risk of dirt.

Consequently, the problem to which the invention is directed to is to develop a grid welding machine that, even with continuous forward feed of the wire, known cubical individual electrodes may be used which demand only a small outlay in electrode material, which may be produced easily and cheaply, which can also easily be exchanged, and can be reused a number of times after wear without difficulty through regrinding, and can be fed practically without loss via flexible current leads connected rigidly to the electrode material and to the current source. The substitution of roller electrodes or electrodes which are sectors of rollers by cubical electrodes which do not roll must be effected in such a way that a considerable increase in the moving masses, which limit the working speed, is avoided.

The problem described is solved by a grid welding machine constructed in accordance with the invention, in which the electrodes and the counter electrodes are arranged at intervals along two electrode beams which are supported in order to be able to move to and fro generally parallel to the feed path of the family of wires in their longitudinal direction. These electrodes and counterelectrodes are coupled in a common motion and may be driven at the welding rhythm, the electrodes on at least one of the electrode beams being guided to be able to shift with respect to it in the direction perpendicular to the feed path and being spring-loaded. A pressure beam is associated with each electrode beam, with rigid links being provided between each electrode beam and the associated pressure beam connector members which transmit the electrode pressures to the pressure beams but allow motion of the electrode beams parallel with the feed path. The pressure beam, which is associated with the electrode beam having the shiftable electrodes, is supported so that it is able to move perpendicular to the feed path and so that it is able to be driven in the sense of an alternating motion at the welding speed of the machine.

In this machine the two electrode beams may be moved in synchronism with the continuously advancing family of wires, over a certain structurally predetermined length of travel. The electrode beams may be constructed to be very light and free from large forces of inertia, because, as distinct from the electrode beams of the known welding machines operating with intermittent grid feed, they do not need to absorb any electrode pressures since these are transmitted to the pressure beams by the connector members.

Hence, the basic idea of the invention lies in subdividing the drive of the electrodes into two components. The pressing motion of the electrodes, during which the electrodes have to cover only very short distances, but in which large forces have to be exerted upon the wire knots perpendicular to their direction of motion, is allotted to a heavy pressure beam and transmitted by it to the electrodes via link-like connector members which in themselves are rigid. The motion of following the family of wires or the grid which is being fed forward at uniform speed, during which motion the electrodes have to cover greater lengths of travel than during the pressing motion, but without any component of force having to be exerted in this direction upon the grid, is all that is allotted to the electrode beams, the function of which is therefore used up only in the guidance of the electrodes.

Figure 2:
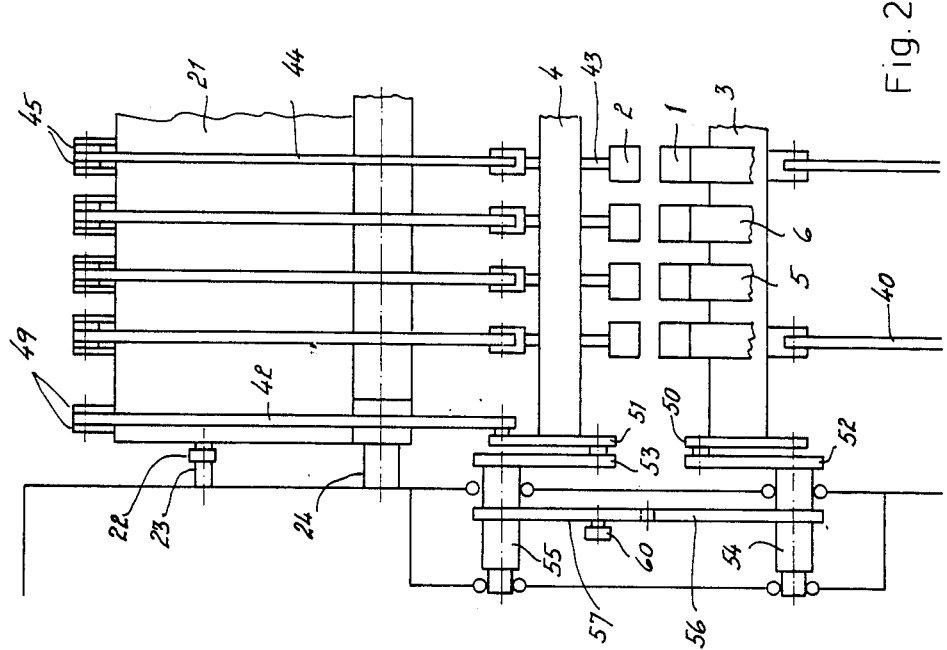

The invention will now be described in greater detail with the aid of embodiments by reference to the drawings. There is shown in:

FIG. 1—a diagrammatic side elevation of a grid welding machine in accordance with the invention, in longitudinal section;

FIG. 2—part of a front view of FIG. 1; and

Figure 3:
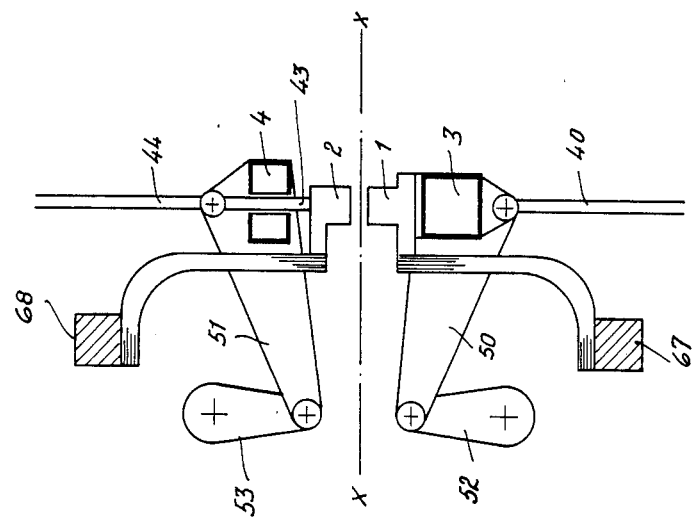

FIG. 3—an alternative execution of the current supply for the welding electrodes.

The feed path of the family of wires and of the grid which is to be produced is designated in FIGS. 1 and 3 as X—X. Below and above this path of advance rows of electrodes 1 and 2 are arranged along and insulated from electrode beams 3 and 4 which extend across the whole width of the machine. The lower electrodes 1, in the embodiment of FIG. 1 are associated with one another in pairs and connected via conductor straps 5,6 to the secondary circuits of transformers (not shown). The upper electrodes 2 in this embodiment are connected via conductor straps 7 to a beam 8 of highly conductive material, preferably copper, which extends across the whole width of the machine and forms a passive current bridge common to all of the upper electrodes. In FIG. 2 the conductive straps 5, 6 are merely indicated, the straps 7 and the beam 8 are completely omitted, so that they do not conceal parts which are essential for the further description of the machine.

Two pressure beams 20, 21 extend likewise across the whole width of the machine. These beams are very strongly constructed in order to be able to absorb the whole of the forces applying pressure to the material being welded during the welding process without measurable deformation.

The pressure beam 21 is hinged at its ends to a pair of one-armed levers 22 which in turn are each supported to be able to swing about a pivot pin 23 in one wall of the machine housing.

A shaft 24 which is supported at both ends so as to be able to turn in the machine housing, carries near its ends two one-armed levers 25, connected to it so that they turn together. The levers 25 are axially parallel with the levers 22, are the same length as them and are likewise connected by hinges to the pressure beam 21. The levers 22 and 25 therefore form a parallelogram linkage for the pressure beam 21. A connecting rod 28 which can be driven from an eccentric 27 engages with a further one-armed lever 26 which is connected to the shaft 24 so as to rotate with it. The parts 25 to 28, for simplification, are not shown in FIG. 2.

The pressure beam 20 may be arranged stationary in the machine housing, but is preferably supported to be able to move in a similar way to the pressure beam 21. For this purpose it is hinged at each end to two one-armed levers 30 and 31 which again form a parallelogram linkage. The lever 31 is connected to be able to rotate with a shaft 32 which is rotatably supported in the machine housing, whilst the lever 30 is supported pivotally directly in the machine housing. A further one-armed lever 33 which is connected to the shaft 32 so as to turn with it, allows adjustment of the height of the pressure beam 20 via a spindle 34 which may be actuated by hand. It is thereby possible always to set the pressure beam 20 so that, independently of the thickness or of the degree of wear of the electrodes and independently of the different thicknesses of the wire knots, depending upon the diameters of the wires which are to be welded, satisfactory contact of the electrodes with the material to be welded is always ensured.

The lower electrode beam 3 is supported with respect to the pressure beam 20 via thrust rods 40 which are connected to this electrode beam and also to respective supporting arms 41 of the associated pressure beam 20 by pivots and are therefore constructed as link supports. These thrust rods 40 connect the electrode beam 3 and the pressure beam 20 together in such a way that the electrode beam 3 can move relatively to the pressure beam 20 merely in one direction which is substantially parallel with the path X—X of advance of the wires.

In order to keep the bending stresses in the electrode beam 3 as low as possible, thrust rods 40 are arranged at regular intervals along the electrode beam 3. In the embodiment illustrated every third electrodes 1 is supported by means of a thrust rod 40 against the pressure beam 20. The inertia forces occuring during the motion of the electrode beam 3 are thereby reduced as far as possible and finally driving power is thereby saved.

In the case of the upper electrode beam 4 the transmission of force might be effected in a similar manner, except that upon lowering the pressure beam 21 the individual electrodes 2 would have to be pressed against the material to be welded by spring plungers guided to be able to slide in the electrode beam and able to be pre-stressed individually. But preferably the kind of transmission of force illustrated in FIGS. 1 and 2 is chosen. In this case each electrode 2 is guided by means of a guide rod 43 able to slide in the electrode beam 4. A thrust rod 44 is hinged to each guide rod 43 and in turn is connected by a pivot to the, preferably fork-shaped, end portion of one arm of a two-armed lever 45. The two armed lever 45 is supported pivotally on the pressure beam 21. The second arm of this lever is loaded by a compression spring 46 which likewise bears against the pressure beam 21 and the tension of which may be altered by an adjusting screw 47. A stop 48 limits the degree of movement of the two-armed lever. Through this arrangement the pressure applied by the pressure beam is transmitted directly to the individual electrodes. The electrode beam therefore remains completely unloaded and serves merely for guidance of the electrodes in their motion in parallel with the path of advance of the grid.

At each end of the electrode beams 3, 4 is arranged an endplate 50, 51. One corner of the endplate 51 is hinged to a link 42. The other end of link 42 is connected by a pivot to a fork-shaped supporting arm 49 on the pressure beam 21, whereby the electrode beam 4 is guided so that it can move relatively to the pressure beam 21 essentially in parallel with the path X—X of advance of the wires. In FIG. 1, the link 42 and the supporting arm 49 are concealed by the thrust rods 44 and levers 45 lying in the same alignment.

Matching corners of the endplates 50, 51 are further connected by pivots to associated links 52, 53 arranged to rotate together with a shaft 54, 55 supported pivotally in one wall of the machine. A toothed segment 56, 57 is connected to each shaft 54, 55. The two toothed segments mesh together and in this way impose synchronous motion of the two electrode beams 3, 4 in the direction of the arrow P in FIG. 1 in parallel with the path X—X of advance of the wires.

The toothed segment 57 is connected by a pivot to the one end of a coupling rod 60, the other end of which is hinged to one of two parallel one-armed levers 61 which are connected to a shaft 62 to rotate with it, whilst the second of the levers 61 carries a cam follower roller 63. The common shaft 62 compels both levers 61 to follow the motion imparted to them via the follower roller 63 by a cam 65. A compression spring 64 loads the levers 61 in the direction towards the cam 65. In FIG. 1, for the sake of simple illustration the cam 65 is shown symbolically by a circle eccentric with respect to a camshaft 66.

While the embodiment of FIGS. 1 and 2 illustrates a welding machine which is to be operated in known manner by A.C., FIG. 3 explains the possibility of operating the electrodes 1, 2 with D.C. For this purpose two busbars 67, 68 arranged symmetrically with respect to the plane X—X of advance of the wires are provided, one of which is connected to the positive pole and the other to the negative of a D.C. source.

The current supply to these busbars is effected from the side outside the machine frame in such a way that the one busbar is connected at its end facing the observer, but the other busbar is connected at its end lying remote from the observer of FIG. 3, to the pole of the D.C. source associated with the busbar in question.

The machine in accordance with the invention operates as follows:

In the position of rest the eccentric 27 is lying in its bottom deadcenter position. As soon as the camshaft 66 and the cam 65 start to turn, the connecting rod 28 starts to move upwards and swings the one-armed lever 26 counterclockwise, whereby the pressure beam 21 is moved downwards parallel with itself. This motion is transmitted via the links 42 (FIG. 2) to the electrode beam 4 and simultaneously via the thrust rods 44 also to the electrodes 2.

Simultaneously with this motion, the cam 65 starts to accelerate the follower roller 63 in the direction of the arrow P, which shows the movement of the material to be welded. This motion is transmitted via the coupling rod 60 to the toothed segment 57 and by the latter on the one hand via the shaft 55 to the link 53 and from this to the endplate 51 and thereby finally to the upper electrode beam 4. On the other hand, this motion is transmitted via the toothed segment 56, the shaft 54, the link 52 and the endplate 50 to the lower electrode beam 3.

The two electrode beams 3, 4 therefore start together to move in the sense of a motion following the material to be welded, which is fed forward continuously in manner which is known and is therefore not shown, and take with them in this motion the electrodes 1 and 2 respectively which are carried or guided respectively by them.

At the same time the upper electrode beam 4, and with it the upper electrodes 2 because of the downwards motion of the pressure beam 21, approach from above the material to be welded.

The cam 65 is so shaped that the electrode beams 3, 4, shortly before the upper electrodes 2 seat against the material to be welded, reach the same speed as the material to be welded, which is fed forward continuously, and from this moment on are moved onwards at constant speed. As soon as the upper electrodes 2 seat against the wire knots which are to be welded, they terminate their motion in the vertical direction and their guide rods 43 start to slide in the electrode beam 4 which is moving on downwards. Since the pressure beam 21 continues its downwards motion further, the two-armed levers 45 start to turn clockwise about their pivot pins so that the compression springs 46 become stressed and the necessary welding pressure is generated.

Now the welding current may be switched on. After running through the upper deadcenter of the eccentric 27 the motion of the pressure beam 21 reverses, and the pressure beam 21 and with it the electrode beam 4 starts to move upwards. However, the upper electrodes 2 still remain resting against the material to be welded, until the compression, springs 46 have been relieved of stress to the point that the two-armed levers 45 are prevented by the stop 48 from turning further counterclockwise.

Meanwhile, the welding current, shortly after the eccentric 27 has run through the upper deadcenter, has been switched off. As long as the compression springs 46 are still stressed, the electrodes 1, 2 are pressing the already welded wire knots together in order to consolidate the points of weld.

As soon as the electrodes 2 have lifted from the material to be welded, the cam 65 releases the follower roller 63, whereupon the compression spring 64 stretches. In doing so, it carries the electrode beams 3, 4 back into their starting position.

Obviously, instead of the execution shown a cam might be provided having a guide groove cut into it, in which the follower roller engages so that both the working motion and the return motion of the electrode beams are controlled directly by the cam itself. Naturally in this case the compression spring 64 may be omitted.

The drive of the shaft 66 carrying the eccentric 27 and the cam 65 may be effected from the main driving shaft of the welding machine with the interposition of an appropriate reduction gear. In this case, however, it is only possible to weld grids having a quite definite structurally predetermined pitch between the rows of points of weld.

If grids are to be welded in which the pitch between the rows of weld points has a length which may be optionally chosen, which as a rule will be the case, a one-stop clutch must be interposed between the main driving shaft of the welding machine and the shaft 66. Upon switching in this clutch, the cam disc 65 starts to turn and triggers all of the sequences of motion already described. After the welding of one row of wire knots and the return of the electrode beams 3, 4 and of the pressure beam 21 into their starting positions, the clutch connection between the main driving shaft of the machine and the shaft 66 is automatically interrupted again.

The material to be welded, which is fed forward at uniform speed, now covers a certain length of path until a further series of wire knots lying in alignment arrives within the welding range and the one-stop clutch gets switched on again by electronic control members.

It is finally also possible to provide a completely separate drive for the camshaft 66. A hydraulic motor, for example, may be used, which can be controlled electronically by means of electrohydraulic valves from a central control apparatus.

Instead of the drives by cam and eccentrics, described merely as one embodiment, other driving means may naturally also be applied, e.g., two hydraulic operating cylinders controllable by electrohydraulic servo valves, one cylinder for the drive of the electrode beams and one for the drive of the pressure beam.

We claim:

1. An electrical resistance welding machine for welding a family of wires into a strip of welded mesh, said family of wires passing through said machine at a continuous rate along a feedpath, comprising
a row of electrodes and a row of counter-electrodes arranged above and below said family of wires,
first and second electrode beams supporting said row of electrodes and said row of counter-electrodes respectively, said electrodes and counter-electrodes being arranged at intervals along said electrode beams in opposition to one another, said electrode beams being adapted to carry out reciprocating movement substantially parallel to said feedpath, said first and second electrode beams being coupled together for synchronized movement, said row of counter-electrodes being supported in said second electrode beam for shifting movement relative to said second electrode beam in a direction perpendicular to said feedpath, first and second pressure beams associated with and connected to said first and second electrode beams respectively, one of said pressure beams being connected to its associated electrode beam so as to transmit electrode pressure to said electrodes and counter-electrodes while allowing said electrode beams to carry out their reciprocal motion, said pressure beam associated with said shiftable counter-electrodes being supported for reciprocating movement in a direction perpendicular to said feedpath in synchronization with said reciprocal movements of said first and second electrode beams.

2. The welding machine of claim 1 further comprising rigid connector members hingedly connecting said pressure beams to said electrode beams.

3. The welding machine of claim 1 further comprising spring loaded connector members connecting each said shiftable counter-electrode to its associated pressure beam.

4. The welding machine of claim 1 further comprising a plurality of thrust rods and pivot means connecting said electrode beams to their respective pressure beams, said thrust rods being arranged at intervals along said electrode beam.

5. The welding machine of claim 4, further comprising a machine frame, a lower one of said electrode beams being supported in said machine frame so as to be adjustable in a direction perpendicular to said feedpath, and adjustment means for adjusting the portion of said lower electrode beam.

6. The welding machine of claim 4 further comprising
a plurality of links and supporting arms, said links being pivotally connected at one end to an end region of the upper one of said electrode beams in which said shiftable counter-electrodes are supported, and at the other end to said supporting arms connected to the upper one of said pressure beams,
a plurality of guide rods and thrust rods associated with each of said shiftable counter-electrodes, said guide rods being slidably mounted in said upper electrode beam, one end of each of said guide rods being connected to its associated counter-electrode, the other end of each of said guide rods being hingedly connected to its associated thrust rod,
a plurality of two-armed levers connecting said thrust rods to said upper pressure beam, and
spring means associated with said upper pressure beam, said spring means biasing said thrust rods towards said feedpath.

7. The welding machine of claim 1 further comprising
a plurality of endplates, each of said endplates being connected to one end of said electrode beams,
a plurality of shafts arranged in pairs at opposite sides of said feedpath,
a plurality of one-armed levers rigidly connected at one end thereof to each of said shafts, the other end of said one-armed levers being hingedly connected to one of said endplates, and
a plurality of toothed segments, each of said toothed segments being rigidly attached to one of said shafts, the toothed segments associated with shafts on opposite sides of said feedpath being permanently in mesh.

8. An electrical resistance welding machine for welding a family of wires into a strip of welded mesh, said family of wires passing through said machine at a continuous rate along a horizontal feedpath, comprising
a row of electrodes and a row of counter-electrodes arranged above and below said family of wires,
first and second electrode beams supporting said row of electrodes and said row of counter-electrodes respectively, said electrodes and counter-electrodes being arranged at intervals along said electrode beams in opposition to one another, said electrode beams being adapted to carry said electrodes and counter-electrodes along a reciprocating path substantially parallel to said feedpath, said first and second electrode beams being coupled together for synchronized movement, said row of counter-electrodes being mounted in said second electrode beam for movement relative to said second electrode beam in a vertical direction,
first and second pressure beams associated with said electrodes and counter-electrodes respectively, said pressure beams being connected to said electrode beams so as to transmit electrode pressure to said electrodes and counter-electrodes while allowing said electrode beams to carry out their reciprocal motion, said pressure beam associated with said counter-electrodes being supported for reciprocating movement in a vertical direction in synchronization with said reciprocal movements of said first and second electrode beams.

* * * * *